United States Patent
Hubbard et al.

(10) Patent No.: US 11,310,281 B2
(45) Date of Patent: *Apr. 19, 2022

(54) SYSTEMS AND METHODS FOR MONITORING COMPUTER AUTHENTICATION PROCEDURES

(71) Applicant: MasterCard International Incorporated, Purchase, NY (US)

(72) Inventors: Steve E. Hubbard, Leicester (GB); Sheryl J. Lock, St. Charles, MO (US); Sue Ellen Moskowitz, New Rochelle, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,696

(22) Filed: Sep. 30, 2019

(65) Prior Publication Data

US 2020/0028878 A1 Jan. 23, 2020

Related U.S. Application Data

(63) Continuation of application No. 15/249,116, filed on Aug. 26, 2016, now Pat. No. 10,432,667.

(Continued)

(51) Int. Cl.
*H04L 29/06* (2006.01)
*G06Q 20/40* (2012.01)
*H04L 9/32* (2006.01)

(52) U.S. Cl.
CPC .......... *H04L 63/20* (2013.01); *G06Q 20/409* (2013.01); *H04L 9/3226* (2013.01);
(Continued)

(58) Field of Classification Search
CPC ... H04L 63/20; H04L 9/3226; H04L 63/0838; H04L 63/0861; H04L 2209/56; H04L 2463/082; G06Q 20/409
See application file for complete search history.

(56) References Cited

U.S. PATENT DOCUMENTS 5,903,882 A * 5/1999 Asay ............... G06Q 20/40
705/44
6,996,601 B1 * 2/2006 Smith ............... G06Q 10/06
709/203

(Continued)

FOREIGN PATENT DOCUMENTS

CN 101365193 A 2/2009
CN 102124476 A 7/2011

OTHER PUBLICATIONS

Singh et al. "A Secure Multi-Tier Authentication Scheme in Cloud Computing Environment," 2015 International Conference on Circuit, Power and Computing Technologies [ICCPCT], pp. 1-7 (Year: 2015).*

(Continued)

*Primary Examiner* — James R Turchen
*Assistant Examiner* — James J Wilcox
(74) *Attorney, Agent, or Firm* — Armstrong Teasdale LLP

(57) ABSTRACT

A method, implemented using an authentication monitoring (AM) computer device, for monitoring an execution of a digital authentication program is provided. The method includes receiving an authentication data file from an authenticating computer device executing the digital authentication program, wherein the authenticating computer device is associated with an authenticating entity, processing the authentication data file to extract at least one authentication value, testing the authentication value against at least one authentication rule associated with the digital authentication program, determining that a stored metric for the (Continued)

authenticating computer device fails to meet a predefined benchmark, wherein the stored metric is associated with the digital authentication program, and initiating an authentication remediation process, wherein the authentication remediation process causes an update to the digital authentication program used by the authenticating computer device.

20 Claims, 5 Drawing Sheets

Related U.S. Application Data

(60) Provisional application No. 62/210,885, filed on Aug. 27, 2015.

(52) U.S. Cl.
CPC ...... *H04L 63/0838* (2013.01); *H04L 63/0861* (2013.01); *H04L 2209/56* (2013.01); *H04L 2463/082* (2013.01)

(56) References Cited

U.S. PATENT DOCUMENTS

| | | | |
|---|---|---|---|
| 7,431,207 B1 | 10/2008 | Neemann et al. | |
| 8,271,395 B2 | 9/2012 | Dominguez et al. | |
| 8,762,283 B2* | 6/2014 | Gerber | G06Q 20/02 705/74 |
| 9,471,920 B2* | 10/2016 | Kolkowitz | G06Q 20/3821 |
| 2002/0194138 A1* | 12/2002 | Dominguez | G07F 7/1008 705/64 |
| 2003/0154406 A1* | 8/2003 | Honarvar | G06Q 20/4014 726/10 |
| 2005/0187866 A1* | 8/2005 | Lee | G06Q 40/04 705/39 |
| 2007/0245157 A1 | 10/2007 | Giobbi et al. | |
| 2008/0095410 A1 | 4/2008 | Shalev et al. | |
| 2009/0164941 A1 | 6/2009 | Johnson et al. | |
| 2009/0319287 A1* | 12/2009 | Hammad | G06Q 40/02 705/1.1 |
| 2010/0100945 A1 | 4/2010 | Ozzie et al. | |
| 2010/0161470 A1* | 6/2010 | Wiesman | G06F 21/31 705/35 |
| 2010/0212009 A1* | 8/2010 | Salyards | H04L 9/3226 726/19 |
| 2010/0287099 A1* | 11/2010 | Liu | G06Q 20/4016 705/44 |
| 2011/0029456 A1* | 2/2011 | Coughlan | G06Q 40/00 705/36 R |
| 2011/0162052 A1 | 6/2011 | Hayward | |
| 2011/0218879 A1 | 9/2011 | Roche et al. | |
| 2011/0246367 A1 | 10/2011 | Li et al. | |
| 2012/0109749 A1* | 5/2012 | Subramanian | G06Q 30/0255 705/14.53 |
| 2012/0143722 A1 | 6/2012 | John | |
| 2012/0150688 A1 | 6/2012 | Li et al. | |
| 2012/0167162 A1 | 6/2012 | Raleigh et al. | |
| 2012/0265755 A1 | 10/2012 | McNally et al. | |
| 2013/0138568 A1 | 5/2013 | Dittmer | |
| 2013/0176940 A1 | 7/2013 | Hohammed et al. | |
| 2013/0204786 A1 | 8/2013 | Mattes et al. | |
| 2013/0227678 A1 | 8/2013 | Kang et al. | |
| 2013/0275247 A1 | 10/2013 | Ramaratnam et al. | |
| 2013/0333010 A1* | 12/2013 | Chougle | G06F 21/31 726/7 |
| 2014/0053238 A1 | 2/2014 | Brannon | |
| 2014/0101734 A1* | 4/2014 | Ronda | G06F 21/6227 726/5 |
| 2014/0289833 A1* | 9/2014 | Briceno | H04W 12/06 726/7 |
| 2014/0297564 A1* | 10/2014 | Carter | G06Q 40/06 705/36 R |
| 2014/0304158 A1 | 10/2014 | Basu et al. | |
| 2015/0026761 A1 | 1/2015 | Raleigh et al. | |
| 2015/0033310 A1 | 1/2015 | Chen et al. | |
| 2015/0081541 A1 | 3/2015 | Hogg | |
| 2015/0088733 A1 | 3/2015 | Monastyrsky et al. | |
| 2015/0178735 A1* | 6/2015 | Liu | G06Q 20/405 705/44 |
| 2015/0180829 A1 | 6/2015 | Yu | |
| 2015/0181171 A1 | 6/2015 | Park | |
| 2015/0317720 A1 | 11/2015 | Ramaratnam et al. | |
| 2015/0317852 A1 | 11/2015 | McGeachie | |
| 2015/0379515 A1 | 12/2015 | Hammad et al. | |
| 2016/0135046 A1 | 5/2016 | John Archibald et al. | |
| 2016/0180484 A1* | 6/2016 | Roebuck | G06Q 50/265 705/31 |
| 2016/0239771 A1* | 8/2016 | Gukal | G06Q 10/0635 |
| 2018/0025341 A1* | 1/2018 | Chandra | G06F 16/90324 705/39 |

OTHER PUBLICATIONS

Sung et al "User Authentication Using Mobile Phones for Mobile Payment," ICOIN 2015, IEEE, pp. 51-56 (Year: 2015).*

European Extended Search Report, Application No. 16840202.2 dated Dec. 7, 2018, 9 pps.

International Search Report and Written Opinion, Application No. PCT/US2016/048958, dated Nov. 29, 2016, 7 pps.

Liu et al., "A Survey of Payment Card Industry Data Security Standard," IEEE Communications Surveys & Tutorials, vol. 12, No. 3, Third Quarter 2010, pp. 287-303).

Payne et al., "System Event Monitoring for Active Authentication," IT Pro, Jul.-Aug. 2013, IEEE Computer Society, pp. 34-37 (Year: 2013).

China First Office Action, Application No. 201680063032.3, dated Aug. 4, 2021, 21 pps.: with English translation.

* cited by examiner

SYSTEMS AND METHODS FOR MONITORING COMPUTER AUTHENTICATION PROCEDURES

CROSS REFERENCE TO RELATED APPLICATIONS

This application claims priority to and is a continuation application of U.S. patent application Ser. No. 15/249,116, filed Aug. 26, 2016, entitled "SYSTEMS AND METHODS FOR MONITORING COMPUTER AUTHENTICATION PROCEDURES," which claims the benefit of priority to U.S. Provisional Patent Application Ser. No. 62/210,885, filed Aug. 27, 2015, entitled "SYSTEMS AND METHODS FOR MONITORING COMPUTER AUTHENTICATION PROCEDURES," the entire contents and disclosure of which are hereby incorporated by reference in their entirety.

BACKGROUND

This invention relates generally to systems and methods for managing authentication procedures and, more particularly, to systems and methods for monitoring compliance and enforcing the use of a range of authentication methods as within specific constraints.

Financial transaction cards are widely used in the United States and elsewhere as a means to attract financial accounts to financial institutions and, in the case of payment cards, as a medium to create small loans and generate interest income for financial institutions.

The financial transaction card industry is subject to certain well-known problems. For example, in the payment card industry it is well-known that at least some persons will engage in fraudulent activities through either the theft of a payment card or a payment card number. The utilization of financial transaction cards in online transactions exacerbates the risk of fraudulent activity. Financial transaction card companies have thus implemented increased security measures to reduce the instances of such fraudulent activity. Many increased security measures utilize a standardized protocol for authenticating a user by communicating transaction information between computer devices and requiring a user to provide authentication credentials (e.g., a user name and/or password) in addition to a payment card number to complete a transaction with a merchant.

However, cardholders often consider increased security measures to be an interference, an inconvenience, or an outright barrier to proceeding with the transaction. Increased security measures may require cardholders to provide additional data (e.g., personally identifiable data or biometric data). Cardholders find it difficult to retain or quickly retrieve such additional data. Other cardholders simply are unhappy with the slow and tedious experience of (sometimes repeatedly) providing additional data. Still others may not wish to share additional data due to trustworthiness concerns. Cardholders tend to terminate transactions because the attendant security measures are overly cumbersome or undesirable. Accordingly, increased security measures reduce the proportion of successful financial transactions, leading to losses for merchants, banks, and other financial entities. Moreover, certain security measures may not operate properly on particular platforms (e.g., a mobile device) leading to further cardholder frustration and resulting in termination of the transaction.

BRIEF SUMMARY OF THE DISCLOSURE

In one aspect, a method for monitoring an execution of a digital authentication program is provided. The method is implemented using an authentication monitoring (AM) computer device comprising a processor and a memory device. The method includes receiving an authentication data file from an authenticating computer device executing the digital authentication program, wherein the authenticating computer device is associated with an authenticating entity. The method also includes processing the authentication data file to extract at least one authentication value. The method further includes testing the authentication value against at least one authentication rule associated with the digital authentication program. The method also includes determining that a stored metric for the authenticating computer device fails to meet a predefined benchmark, wherein the stored metric is associated with the digital authentication program. and The method further includes initiating an authentication remediation process, wherein the authentication remediation process causes an update to the digital authentication program used by the authenticating computer device.

In another aspect, a system for monitoring an execution of a digital authentication program is provided. The system includes an authentication monitoring (AM) computer device comprising a processor and a memory device. The AM computer device is configured to receive an authentication data file from an authenticating computer device executing the digital authentication program, wherein the authenticating computer device is associated with an authenticating entity. The AM computer device is also configured to process the authentication data file to extract at least one authentication value. The AM computer device is further configured to test the authentication value against at least one authentication rule associated with the digital authentication program. The AM computer device is also configured to determine that a stored metric for the authenticating computer device fails to meet a predefined benchmark, wherein the stored metric is associated with the digital authentication program. and The AM computer device is further configured to initiate an authentication remediation process, wherein the authentication remediation process causes an update to the digital authentication program used by the authenticating computer device.

In yet another aspect, a non-transitory computer readable medium that includes computer executable instructions for monitoring an execution of a digital authentication program is provided. When executed by an authentication monitoring (AM) computer device comprising a processor and a memory device, the computer executable instructions cause the AM computer device to receive an authentication data file from an authenticating computer device executing the digital authentication program, wherein the authenticating computer device is associated with an authenticating entity. The computer executable instructions also cause the AM computer device to process the authentication data file to extract at least one authentication value. The computer executable instructions further cause the AM computer device to test the authentication value against at least one authentication rule associated with the digital authentication program. The computer executable instructions also cause the AM computer device to determine that a stored metric for the authenticating computer device fails to meet a predefined benchmark, wherein the stored metric is associated with the digital authentication program. and The computer executable instructions further cause the AM computer device to initiate an authentication remediation process, wherein the authentication remediation process causes an update to the digital authentication program used by the authenticating computer device.

DETAILED DESCRIPTION OF THE DISCLOSURE

Figure 1:
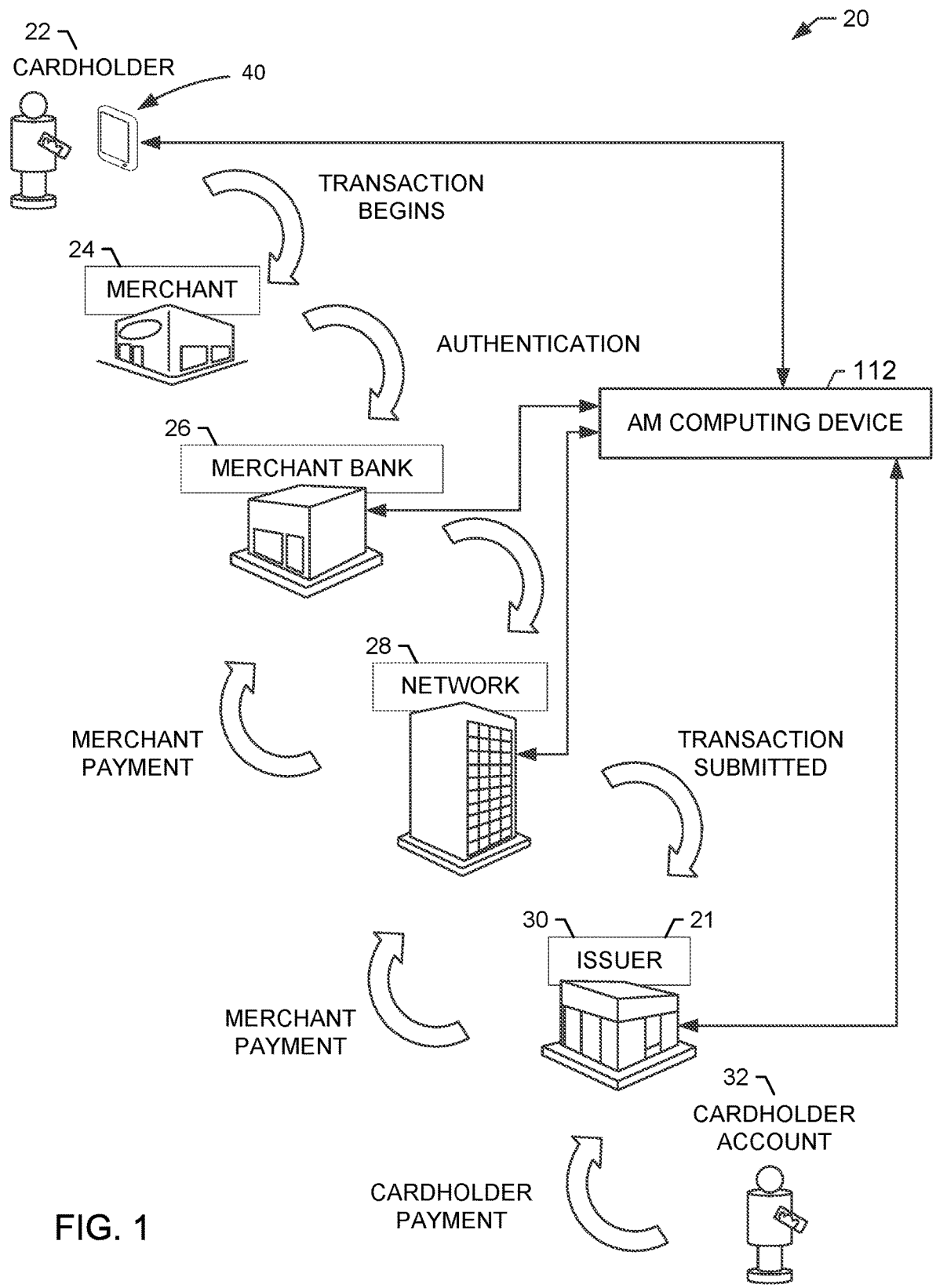
FIG. 1 is a schematic diagram illustrating a multi-party transaction card system for enabling transactions that involve digital authentication programs.

Systems and methods are described herein for monitoring computer authentication procedures. More specifically, systems and methods are described for monitoring and enforcing the usage of specific computer authentication procedures by processing authentication statistics and comparing those statistics to predefined benchmarks (sometimes also called thresholds). The systems and methods further include generating recommendations to entities involved in using the authentication procedures, and updating the enrollment of certain entities if their use of authentication procedures does not meet predefined benchmarks. In the example embodiment, the claimed methods are performed using an Authentication Monitoring (AM) computer device. The AM computer device monitors the use of authentication methods by, for example, merchants and issuers.

In one embodiment, the AM computer device receives authentication data files that contain authentication data for each online payment transaction. The AM computer device uses these authentication data files to check whether an issuer is using a preferred or supported authentication type. If the issuer did not use a preferred or supported authentication type for this transaction, the AM computer device determines whether the merchant terminated the authentication process for that particular transaction or whether the merchant allowed the transaction to be completed without authentication. The AM computer device updates stored statistics for the issuer corresponding to at least one of: transaction terminations, transactions performed without authentication, and authentication type. The AM computer device continuously compares the statistics to a predefined benchmark for each of the statistics. If a statistic does not meet a corresponding benchmark, the AM computer device issues an action recommendation for the issuer including one of: notify issuer, discuss with issuer, assist issuer in meeting benchmarks.

The methods and systems described herein relate to a financial transaction card payment system, such as a credit card payment system using the MasterCard® payment processing network (MasterCard is a registered trademark of MasterCard International Incorporated located in Purchase, New York). The MasterCard® payment processing network uses a proprietary communications standard promulgated by MasterCard International Incorporated® for the exchange of financial transaction data between financial institutions that have registered with MasterCard International Incorporated®.

The following detailed description illustrates embodiments of the invention by way of example and not by way of limitation. It is contemplated that the invention has general application to processing financial transaction data by a third party in industrial, commercial, and residential applications. As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

As used herein, the term "transaction card" refers to any suitable transaction card, such as a credit card, a debit card, a membership card, a promotional card, a frequent flyer card, an identification card, a prepaid card, a gift card, and/or any other device that may hold payment account information, such as desktop or laptop computers, mobile telephones, tablets, personal digital assistants (PDAs), key fobs, or the like.

As used herein, a "communication medium" includes, but is not limited to, a communication channel such as the Internet, a local area network (LAN), a wide area network (WAN), a virtual private network (VPN), a wireless LAN (WLAN), a personal area network, a mobile telecommunications network, a radio frequency (RF) connection, a wired serial data connection, a wired parallel data connection, and/or any system or apparatus for communicating information between computer devices. Alternatively, or in addition, a communication medium may include a protocol and/or a standard defining interaction between computer devices over a communication channel. For example, a protocol and/or a standard may include, without limitation, Hypertext Transfer Protocol (HTTP), Session Initiation Protocol (SIP), Simple Mail Transfer Protocol (SMTP), an online chat protocol (e.g., Extensible Messaging and Presence Protocol), Global Standard for Mobile Communications (GSM®) (GSM is a registered trademark of GSM MoU located in Deansgrange, Ireland), High Speed Packet Access (HSPA), Short Message Service (SMS), Multimedia Messaging Service (MMS), Wireless Application Protocol (WAP), Transmission Control Protocol (TCP), User Datagram Protocol (UDP), and/or Internet Protocol (IP).

The AM computer device may include a communication interface configured to communicate via a communication medium. For example, a communication interface may include, without limitation, a wired or wireless network adapter, a wireless data transceiver for use with a mobile telecommunications network and/or RF communication, a serial data communication adapter, and/or a parallel data communication adapter.

The embodiments described herein are directed to systems and methods for monitoring execution of digital authentication programs when a user is performing a financial transaction over one or more computer devices. The financial transaction is performed by a user of a financial transaction card, such as a credit card, debit card, or other financial transaction card. These users are referred to as cardholders. A cardholder is issued a transaction card by an issuer or an issuing bank. The cardholder is able to use the transaction card at participating merchants to initiate financial transactions. The merchant processes these transactions using a point-of-sale (POS) device (in the case of online transactions, the POS device includes the merchant website used to initiate such online transactions) that captures certain transaction information and communicates this information via a payment network to an acquiring bank and the through a payment processor to the issuer. Information is then exchanged between these parties via the payment processor until the transaction is completed. The computer devices communicate with one another by using a standard computer protocol. In one embodiment, an AM computer device is communicatively coupled to a plurality of merchant computer devices, issuer bank computer devices, and acquirer bank computer devices. Alternatively, the AM computer device is in communication with the merchant computer device via an intermediary access control service (ACS) computer device that may be operated by a third party authentication or access service vendor. The ACS computer device may also be associated with an issuer.

In the example embodiment, prior to completing a financial transaction, a cardholder must authenticate his or her identity to the merchant and/or the issuer. For example, a cardholder may provide a username, a password, or biometric data, to authenticate the cardholder's identity. Using this authentication information, the systems and methods described herein transmit and receive "authentication data files." For example, a merchant computer device may transmit an authentication data file to the AM computer device for each transaction. Alternatively, the merchant computer device may transmit the authentication data file to the AM computer device via the access control service (ACS) computer device. The authentication data file contains authentication information including a type of authentication process being used by the issuer to authenticate the cardholder (e.g., an "authentication type"), the device type used by the cardholder to perform the transaction, the connected issuer computer device address, the merchant computer device address, or the like.

The AM computer device is configured to process the authentication data file for each transaction and determine whether use of the authentication type falls within defined parameters. In one embodiment, the authentication file contains data values as key-value pairs. For example, authentication type is transmitted as AuthType=X (e.g., fingerprint recognition). Other key-value pairs may include TransactionStatus=Accepted/Declined/On Hold; DeviceType=Desktop/Mobile Device/(Brand-name of Device); IssuerAddress=http://issuer1.company.com; or the like. The above examples are illustrations of the content of authentication data files. The AM computer device is configured to interpret and process authentication data files containing data in various formats.

The AM computer device is also configured to monitor and enforce compliance with predefined benchmarks. These benchmarks may be tailored by authentication type, merchant, issuer, or the like. For example, the AM computer device is configured to monitor whether an overall transaction approval rate falls below a certain percentage. The AM computer device is also configured to monitor whether a fraud rate exceeds a predefined number of basis points or a percentage, or whether a "fully authenticated" fraud rate exceeds a certain number of basis points or percentage (e.g., where the cardholder is fully authenticated yet the transaction is ultimately still fraudulent). The AM computer device may also monitor the uptime or availability rate of ACS vendor software. The AM computer device may also monitor the percentage of authentication instances involving risk based authentication that also require step up challenges (discussed further below). The AM computer device may also monitor the percentage of issuer account ranges for which authentication data is transmitted to the AM computer device for analysis and storage.

In addition to receiving authentication data files during a transaction, the AM computer device receives periodic authentication data aside from standard transaction processing (e.g., during an initial or periodic testing process). In one embodiment, authentication data files additionally include one or more of the following data points: issuer enrollment details, issuer/merchant support for device types, and data on issuer and merchant compliance with authentication procedures. Authentication data files may be received from issuer computer devices, acquirer computer devices, merchant computer devices, or ACS computer devices. In contrast to the authentication data files receiving during a transaction, authentication data files may also be received as part of a testing process or during an operations process distinct from a transaction process that generates authentication data files. Authentication data files may include, without limitation, log data files from the sender computer devices, image captures of customer-facing screens (e.g., a screenshot of a mobile device application to ensure that the correct number of numeric characters is provided in a one-time-password), test transaction data from test transactions performed to ensure compliance, or the like. The AM computer device is configured to interpret and analyze authentication data files in order to determine the use of authentication methods and whether their use meets predefined standards or benchmarks.

The following sections describe a number of authentication methods whose use is monitored by the AM computer device.

Risk Based Authentication

In the example embodiment, the exchange of authentication information is subject to a risk-based authentication (RBA) program. RBA for payment card transactions involves evaluating data included within a prior authorization message of a payment card transaction (e.g., to determine a relative risk level associated with the transaction or authentication of the cardholder). At least some known credit/debit card purchases involve the exchange of a number of payment card network messages between the merchant, acquirer, and issuer parties of a four-party payment processing network model. Such messages may include authorizations, advices, reversals, account status inquiry presentments, purchase returns, and chargebacks. The credit or debit card payment transaction messages may include several transaction attributes, such as, for example, primary account number (PAN, either real or virtual), transaction amount, merchant identifier, acquirer identifier (the combination of which with above uniquely identifies a merchant), transaction date-time, address verification, or the like.

In some situations such as in-store payment card purchases (also referred to as card-present transactions), the issuer of the payment card typically assumes liability for certain aspects of the transaction, such as chargebacks. In other situations, such as online transactions (also referred to as card-not-present or card-on-file transactions) through a merchant web site, the merchant party in the transaction assumes initial liability for certain aspects of the transaction unless, for example, certain risk-mitigating steps are taken, such as an authentication step. For example, some known payment networks engage an authentication service such as Verified by Visa® (Visa International Service Association, Delaware) or MasterCard SecureCode® (MasterCard SecureCode is a registered trademark of MasterCard International Incorporated located in Purchase, N.Y.) that utilize the 3DS protocol that performs an authentication of a suspect consumer prior to authorization of the transaction. During some known 3-D Secure transactions, the suspect consumer (i.e., the consumer attempting to perform the payment card transaction with the merchant) is presented with an authentication challenge, sometimes called a "step-up challenge." This step-up challenge generally requires the suspect consumer to provide a password, or a passcode from a second factor user device, before the transaction will be processed. This extra step presents an interruptive inconvenience, barrier, or an interference to at least some legitimate consumers, and subsequently causes at least some consumers to abandon legitimate transactions. These abandonments results in lost revenues to both the merchant and the issuer.

During a payment card transaction, such as an online transaction on a merchant web site, the suspect consumer uses a computer device such as a smart phone or personal computer device to log in to the merchant's website. The suspect consumer selects a payment card for use in the transaction, and the merchant initiates an authentication process (i.e., to gauge whether or not the suspect consumer is a privileged cardholder associated with the payment card). The merchant uses an RBA system to identify one or more pieces of information about the payment card transaction that are used to "score" the transaction for risk (e.g., potential fraud). In one embodiment, the RBA system generates a device score from the device information provided by the suspect consumer and stores it as a session trust level. The session trust level generally indicates a confidence as to whether or not the user of the device is the privileged cardholder. This level may be a level such as, for example, one of "basic", "good", "excellent", and "trusted." The RBA system also generates a payment card score from the payment card information and combines the payment card score with the session trust level to generate an overall transaction risk level for the payment card transaction. From this overall transaction risk level, the RBA system generates a baseline recommendation.

In some embodiments, parties to the transaction (e.g., issuers) may provide to the RBA system certain transaction limits, such as a transaction amount limit for individual payment cards, a daily spend limit, or a number of transactions limit. Further, these limits may be customized based at least in part on the overall transaction risk level. For example, transactions that the RBA system scores as less risky (e.g., "excellent" or "trusted" overall risk level) may have higher thresholds (e.g., higher transaction amount limit) than transactions that the RBA system scores as more risky.

In another aspect described herein, the RBA system sends risk-based authentication data to the issuer's ACS via an extension message to the 3DS protocol. For example, the RBA system may score the payment card transaction and provide an overall score and/or an overall recommendation to the issuer's ACS by embedding an XML-formatted message as a 3DS extension during the authentication process. The RBA system may send other "sub-scores" within the 3DS extension message, such as the device score or the payment card score. In some embodiments, the RBA system may share individual risk-based data elements such as the method the suspect consumer used to authenticate. Using this risk-based data, the issuer's ACS determines whether or not the suspect consumer should be further authenticated (e.g., through a 3DS "step-up" challenge).

At least two types of RBA are evaluated by the AM computer device: RBA and RBA without a challenge method but with a limited decline strategy within new guidelines. Both types are explained in greater detail herein.

RBA, Apart from the Approved Challenge Method

RBA looks at each transaction individually and consists of the use of a risk scoring engine that utilizes behavioral and transaction inputs in order to score a transaction in conjunction with an authentication solution such as the AM computer device. The scoring results into one of the three categories: low risk—(cardholder fully authenticated), medium risk (further authentication required before an authentication can be confirmed), or high risk (resulting in a failed authentication). In the exemplary embodiment, these behavioral and transaction inputs will include: device or PC fingerprint information, cardholder purchase history, and transactional data such as purchase amount and currency, and merchant type, but is not limited to these. In a deployment of RBA, when the resulting score indicates a low transactional risk, the ACS computer device generates a fully authenticated accountholder authentication value (AAV) without the need to prompt the cardholder to authenticate. The ACS-provided AAV is sufficient for the cardholder to be authenticated.

When the transactional risk is medium to high, an issuer may, via an issuer computer device, choose to offer the cardholder the opportunity to verify identity, (for example, using a step-up authentication method). When the ACS computer device generates a fully authenticated AAV, regardless of the authentication method used, the ACS computer device generates the AAV by utilizing an appropriate electronic commerce indicator (ECI) value and a control byte. The AM computer device is configured to analyze the generated AAV to check whether the correct ECI value has been applied in generating the AAV.

Additionally, the AM computer device is configured to test any RBA implementation for a number of performance factors. In one embodiment, checking these performance factors includes ensuring that, after an initial six month learning period, the RBA solution does not prompt cardholders for step-up authentication on more than a predefined percentage (e.g., 15%) of transactions, unless a fraud event requires special handling. The total percentage of prompts will be measured quarterly. The AM computer device ensures utilization of the correct ECI values in conjunction with the AAV control byte. In one embodiment, a fully authenticated AAV begins with a lower case "j" and has an ECI indicator of 02, regardless of whether the decision to authenticate was made via an actual step-up prompt or via a risk-based decision. The AM computer device checks whether machine fingerprint/device ID is being utilized as an attribute by the risk engine. The RBA system must also monitor authentication requests. It must not be possible for unauthorized users to probe the system (even intermittently over a prolonged period) to determine parameter settings for the RBA system without creating a system alert.

Risk-Based Authentication, without a Challenge Method but with Limited Decline Strategy within New Guidelines As noted above, risk-based authentication consists of the use of a risk scoring engine that utilizes behavioral and transaction inputs in order to score a transaction in conjunction with the AM computer device. Typically, these inputs include device or PC fingerprint information, cardholder purchase history, and transactional data (such as purchase amount and currency, and merchant type, but is not limited to these). Should the resulting score indicate low transactional risk, then there is no need to prompt the cardholder to verify identity. While low risk transactions are not actively verified, the issuer's ACS computer device must generate an AAV to indicate full authentication. When an issuer deploys a no-cardholder-challenge method, only high scores will lead to a decline of the transaction. This strategy has no way to support wallet providers for cardholder authentication, since there is no challenge method other than absolute decline. Whether or not step-up challenges are used is at the issuer's discretion, however, the AM computer device is configured to detect whether authentication performance is meeting specific standards. The AM computer device is configured to notify an issuer (one not using step up authentication) that regularly failing the standard will result in the issuer being required to deploy a step-up solution.

As with the "RBA, Apart from the Approved Challenge method" described earlier, the AM computer device is configured to ensure performance standards are met when an issuer uses RBA without a challenge method but with a limited decline strategy as above. Performance factors tested include, without limitation: i) testing whether the issuer implementation maintains an optimal rate of declined transactions (e.g. 7%), ii) ensuring that a rejected/failed transaction message includes a 24×7 customer service number, iii) testing whether issuer customer service agent is able to enable an erroneously declined transaction and override another RBAS decline, iv) ensure that issuer reviews and updates risk engine rules model yearly v) testing that issuer utilizes machine fingerprint/device ID as rule attribute, vi) ensure that issuer adds additional attributes/sources of identity data as possible to minimize cardholder impact. Additionally, the RBAS must monitor authentication requests. It must not be possible for unauthorized users to probe the system (even intermittently over a prolonged period) to determine parameter settings for RBAS without creating a system alert.

Primary Authentication Methods

In the example embodiment, specific authentication methods are categorized according to business preference and monitored for their specific usage. For example, certain authentication methods are termed "primary authentication methods." Others are considered "fallback authentication methods" (i.e., acceptable authentication methods to be used in the event that primary authentication methods are not feasible). Unacceptable authentication methods are termed "disallowed authentication methods." In one embodiment, certain primary authentication methods are considered "preferred primary authentication methods" (those that are preferentially offered these methods to a cardholder). Other primary authentication methods are also perfectly acceptable, even if they are not preferred. Primary authentication methods are discussed in greater detail below.

Risk-Based Authentication

Preferred primary authentication methods include using risk-based authentication (RBA) methods along with approved step-up challenges. For example, RBA may be used the RBA process may determine that the cardholder should be given a step-up challenge. The AM computer device is configured to recognize the various authentication methods and take action accordingly. In one embodiment, the use of each authentication method must comply with certain benchmarks that the AM computer device is configured to monitor and enforce. For example, the number of transactions declined after RBA with step-up-challenge may not exceed a certain percentage of the total. Accordingly, the AM computer device is configured to monitor whether, for example, an authentication data file contains both AuthenticationType=RBA+StepUp and Status=Decline. In case a certain percentage of authentication data files contain the above data, the AM computer device is configured to contact the associated issuer computer device, and notify the associated issuer that a benchmark has been exceeded. The AM computer device is also configured to recommend that the issuer take steps to adjust its authentication procedure such that a greater number of cardholders have a more positive authentication experience (i.e., fewer declines).

Biometric: Fingerprint Match

In one embodiment, the cardholder may be required to provide a biometric fingerprint match (i.e., provide a fingerprint for comparison to a stored fingerprint image for the cardholder). Biometric fingerprint matching utilizes the cardholder fingerprint to authenticate the cardholder. The cardholders fingerprint is utilized during the provisioning process. During the purchase authentication, the cardholder is prompted to place a finger on the device to authenticate the authenticity of the cardholder.

The AM computer device checks the authentication solution provided by the issuer (or merchant) for a number of performance factors. For example, the cardholder should be notified and provide consent for use and storage of personal data. The cardholder device ID must be part of the solution. Cardholders should be given the ability to opt-out of the authentication process and returned to the issuer/merchant. When the cardholder opts out of authentication, the issuer may choose to fail the authentication. The provisioning process should rely on issuer's online banking site or mobile application. Security questions should not be allowed.

Biometric: Facial Recognition

In yet another embodiment, the cardholder may need to undergo biometric facial recognition (i.e., provide a facial image for comparison to a stored facial image for the cardholder). Biometric facial recognition utilizes features of the face in combination with a liveness test to authenticate the cardholder. The inclusion of the liveness test is to prevent spoofing.

The AM computer device checks the authentication solution provided by the issuer (or merchant) for a number of performance factors. For example, the cardholder should be notified and provide consent for use and storage of personal data. The cardholder device ID must be part of the solution. The cardholder must be required to perform "liveness" testing, (e.g., an eye blink). The cycle time for verification must meet standard of 20 seconds or less. On-screen directions for photo taking, positioning, and lighting requirements should be provided. Cardholders should be given the ability to opt-out of the authentication process and returned to the issuer/merchant. When the cardholder opts out of authentication, the issuer may choose to fail the authentication. The provisioning process should rely on issuer's online banking site or mobile application. Security questions should not be allowed.

Related to the biometric methods described above (fingerprint and facial recognition), another preferred primary authentication method includes the cardholder undergoing biometric or fingerprint matching directly without going through the RBA process. Additionally, where an RBA system determines that the cardholder presents a low risk, no step-up challenge is provided to the cardholder. Rather, the cardholder continues with performing the transaction after the RBA process is completed.

Biometric: Voice Recognition

Biometric voice recognition identifies a person from characteristics of the voice to recognize the voice speaking. At the time of provisioning, the cardholder's voice is analyzed for unique characteristics. At time of authentication, the cardholder is asked to repeat a phrase to authenticate the cardholder.

In one embodiment, biometric voice recognition is a primary authentication method that is allowed but not preferred. In one embodiment, biometric voice recognition is combined with an additional security factor such as a dynamically generated code or the cardholder's received location data. In one embodiment, the AM computer device is configured to monitor whether the cardholder's device identifier is transmitted within the authentication data file, when biometric voice recognition is used.

The AM computer device checks the authentication solution provided by the issuer (or merchant) for a number of performance factors. For example, the cardholder should be notified and provide consent for use and storage of personal data. The cardholder device ID must be part of the solution. Cardholders should be given the ability to opt-out of the authentication process and returned to the issuer/merchant. When the cardholder opts out of authentication, the issuer may choose to fail the authentication. The provisioning process should rely on issuer's online banking site or mobile application. Security questions should not be allowed. PC-based solutions should enable the cardholder to specify which number to have the interactive voice recognition (IVR) system dial for voice recognition.

Display Cards with PIN Pads

Use of a display card or display token in conjunction with a personal identification number (PIN) pad is yet another primary authentication method monitored by the AM computer device. A display card is an electronic device configured to display a one-time password or passcode for entry into a PIN pad for authentication. For example, a cardholder performing a transaction will activate the display card, which generates a one-time password that the cardholder then enters into the merchant's PIN pad displayed on the cardholder device. In one embodiment, the AM computer device monitors whether the display cards are compatible with a payment processor's specifications. The AM computer device also monitors whether the display cards meet Chip Authentication Program (CAP) specifications. CAP specifications involve the cardholder being issued a smartcard that contains a chip. The cardholder inserts the smartcard into a CAP reader (e.g., a card slot in a laptop), and enters a PIN into the cardholder device. The two-factor authentication using both the smartcard and the PIN increases security.

Push Notification Requesting Approval from Cardholder as Out-of-Band Method

Push notifications requesting transaction approval from the cardholder via a different channel or network are yet another primary authentication method monitored by the AM computer device. For example, where a cardholder initiates a transaction, the merchant may send the cardholder a notification via phone or SMS message using a number in the merchant's records. This method allows cardholders to authorize transaction using their mobile devices. At the time of authentication, a push notification containing the transaction details from a mobile application operating on the mobile device is generated to the cardholder mobile device requesting the user to accept or reject the transaction. The notification requires a tap to confirm or reject the purchase. If the user accepts the transaction, the confirmation message is sent to the issuer and the transaction is completed. If the user rejects the transaction, the transaction is stopped.

The AM computer device monitors whether the notification works on both smartphones and feature phones and whether the notification includes bank name, merchant name, and transaction amount/currency. The AM computer device ensures that a fallback method is provided if notification times out. The AM computer device ensures that the notification method offers the cardholder a second chance to confirm purchase by using an "Are you sure"-type prompt. The AM computer device ensures that the push notification is converted to SMS to accommodate cardholders with feature phones. The AM computer device ensures that the notification includes a certificate validation application or device fingerprint. Additionally, the AM computer device ensures that the set-up for every out-of-band channel is assessed for risk of compromise from Zeus and other man in the middle browser attacks.

Handheld Token Generators/Fobs

Handheld token generators, which may also be used with online banking systems, are yet another primary authentication method monitored by the AM computer device. The cardholder is prompted to generate an authentication token utilizing a bank issued token generator. This method often utilizes a PIN or requires the cardholder to insert an EMV chip card to generate a one-time use code. The AM computer device checks whether the method requires a PIN before generating dynamic number. The AM computer device ensures that there are reissuance practices in place if lost and that a fallback method is provided. The AM computer device ensures that the handheld token method provides the cardholder the ability to re-sync his or her devices and reset his or her own PINS. The AM computer device ensures that the deployed handheld token method adheres to certain predefined server security requirements and code generation requirements (e.g., unpredictability, to maintain synchrony between the server and the generator).

One-Time Password Via SMS

Another preferred primary authentication method includes the cardholder being provided a one-time password (OTP) via some other channel (e.g., via SMS or mobile application) that is used to authenticate the cardholder. One-time password generation with delivery to cardholder via SMS is an out-of-band cardholder authentication solution. A one-time use code is generated by the issuer or its associated ACS computer and delivered to the pre-designated cardholder mobile phone via a short message service (SMS) text. The cardholder then enters this code into the issuer authentication prompt displayed during the authentication process. The AM computer device tests the deployed OTP solution to ensure that the SMS message must include bank name, and transaction amount and currency. The AM computer device also ensures that the OTP expires 10 minutes after issuance and is good only for one purchase. The AM computer device checks whether the OTP contains between 6-8 digits, all numeric. The AM computer device checks whether the OTP includes abbreviated merchant name (if possible). The AM computer device checks that only the last 4 digits of the cardholder's PAN is displayed in the body of the text message to confirm genuineness. Additionally, issuers should proactively monitor SMS delivery failures to protect against large scale delivery failures.

One-Time Password Via Mobile App

A one-time password is generated for cardholder use via a downloaded mobile application for this out-of-band cardholder authentication solution. A one-time use code is generated by the mobile application, which is typically provided by the ACS computer device associated with the issuer or merchant. The cardholder then enters this code into the issuer authentication prompt displayed during the authentication process. The provisioning process that allows the cardholder to use the app for transactions is critical to the success of this solution.

The AM computer device ensures that the OTP expires 10 minutes after issuance and is good only for the specific purchase. The AM computer device ensures that PIN, code, gesture, or other biometric check is required to open the mobile application. The AM computer device ensures that there is credential vetting on the issuer's online banking site that precedes activation of the mobile application. The AM computer device ensures that the OTP contains between 6-8 digits, all numeric and that the mobile application displays only the last 4 digits of the PAN.

Issuer Portal Verification

This authentication method involves re-directing the cardholder from a merchant site to their issuer site for verification. If an issuer does not want its ACS provider to manage any of its cardholder data or authentication processes, the issuer can use an issuer portal approach where the cardholder is instantly connected to the issuer's firewall site where credentials can be checked by the issuer only. For this authentication method, the AM computer device ensures that total issuer login/verification session time must not exceed 2 minutes, that the cardholder should not need to complete more than 3 screens, and that issuer must ensure that the redirect back to the merchant site is graceful and successfully completes.

Fallback Methods

If the abovementioned primary authentication methods (preferred or otherwise) are not used by an issuer for a transaction, the AM computer device is also configured to monitor whether certain "fallback methods" are used. In one embodiment, the issuer sends the cardholder an email containing a one-time use password. The AM computer device is configured to monitor whether the email has been transmitted by the issuer and not some other third party, and whether the email contains the bank name, merchant name, transaction amount and currency, and also that the password expires ten minutes after issuance and be good for one purchase only. Email addresses must have Sender Policy Framework (SPF) and Domain Keys Identified Mail (DKIM) into to Domain Name Server (DNS) to ensure that the receiving email server validates the identity of the sending address to reduce the number of phishing or spoof emails.

Disallowed Methods

The AM computer device is further configured to monitor whether any disallowed authentication methods are being used by an issuer for transactions. In one embodiment, the AM computer device monitors whether any static passwords or PINS have been used as a primary or fallback authentication method. Again, the AM computer device checks the authentication data file for data regarding this method (e.g., if AuthType=StaticPassword). This includes random static passwords, bingo cards or the like. Disallowed methods also include use of security questions as the primary or fallback authentication method. Disallowed methods also include biometric technology methods that are not recognized or certified by the AM computer device or associated payment processor. Disallowed methods further include any methods which force cardholders to be redirected to the issuer web site for the method to be verified first.

Enrollment

In one embodiment, the AM computer device enforces specific enrollment approaches based on authentication type. For example, issuers that use one of the supported authentication methods (primary and fallback), other than RBA without a challenge method, must use an acceptable enrollment approach. A manual enrollment process must consist of a secure interface for cardholders to enroll in the service which may be located behind the issuer's firewall for online banking or payment card management portal. An auto-enrollment process must consist of the cardholder being enrolled at time of card issuance or at time of Internet banking registration. Auto-enrollment is not initiated by the cardholder; it must be done by the issuer on behalf of the cardholder. The cardholder must be informed of enrollment and provided with: education materials for cardholder experience, FAQ, and contact information.

Similarly, issuers that use the RBA process with challenge for high risk may use an authentication prompt to instruct the cardholder to provide missing data so that he/she can be authenticated for next transaction, even if the current transaction cannot be completed. The issuer must present the authentication prompt in a manner that does not appear to be phishing. An example of the screen message would be: "This transaction cannot be completed as Bank needs more information to verify identity. Call the toll free number and provide your mobile number for future one-time use password for every participating merchant." Accordingly, the AM computer device receives additional files including authentication data (e.g., from issuer computer devices or ACS computer devices) that contain data on the issuer's enrollment processes and compares the data with the approved approach to ensure compliance. Additionally, the AM computer device monitors whether preferred enrollment approaches are used (e.g., those that feature a strong method of identity and age verification (IDV) at the time of enrollment, and/or using deterministic methods of verifying identity).

Similar to initial enrollment, the AM computer device also receives authentication data files with information for instances where the issuer changes the authentication method. The AM computer device processes the authentication data file to determine if the issuer has educated their cardholders about the service pre- and post-enrollment using any of these methods: direct mail or post-mailer (e.g., at the time of card delivery or separate communication), phone (e.g., at the time of card activation), email, within the online issuer bank website, or within the issuer's mobile application. Finally, the AM computer device also processes authentication data files to determine whether disallowed enrollment methods have been used. These include activation during the cardholder's shopping experience, initiating an identity verification process during shopping, or redirecting to the issuer website for identity verification during shopping.

The AM computer device also monitors issuer support for device types using authentication data files. The AM computer device monitors whether issuer authentication processes are prepared to work without the issuer logo: (issuer must be able to insert their name into body text of messages, rather than separately). Issuer authentication processes must work without the need for excessive customization (e.g., special fonts, custom colors or images which are not part of the authentication process for a wide range of devices) and without introductory pages, because such text is generally superfluous to the authentication step. Issuer ACS companies must recognize devices they can and cannot support and respond appropriately. Issuers must provide FAQs during the authentication process.

The AM computer device also monitors merchant support for device types using authentication data files. The AM computer device monitors whether the cardholder is presented with authentication prompts from that device even if the authentication window cannot be displayed clearly or functional correctly on a particular device. The authentication window (for RBA or step-up) may only be presented to the cardholder on a mobile device if it can be displayed clearly and is functional so that the cardholder can verify their identity when requested to do so.

The AM computer device employs several methods to enforce the predefined benchmarks and associated rules for issuers and merchants. For entry Level ACS partners (or merchant plug-in (MPI) partners that provide authentication services to merchants) the AM computer device enforces whether the partner's initial implementation meets minimum requirements and testing criteria, and checks to see that a recertification process is performed every 2 years or earlier. These partners must also be subject to periodic testing, transmit authentication data to the AM computer device, and send authentication traffic data as well. For partners that fall out of compliance, the AM computer device is configured to initiate an authentication remediation process. In one embodiment, the AM computer device initiates an authentication remediation process that includes a recommendation to reduce or strip away benefits provided by the AM computer device (e.g., reduced or canceled participation in authentication systems associated with the AM computer device, removal of access to proprietary systems or programs, or the like). The AM computer device may also issue pricing surcharges or monetary penalties to partners that fall out of compliance.

At least one of the technical problems addressed by this system includes: (i) high network load based at least in part on step-up challenging most or all card-not-present transactions which results in network delays and reduced bandwidth; (ii) allowing fraudulent transactions to be successfully processed if there is no step-up challenge of a card-not-present transaction; (iii) consumer inconvenience during card-not-present transactions based at least in part on having to answer an additional authentication challenge during a transaction; (iv) abandonment of transactions by consumers when faced with a step-up challenge, thus leading to lost sales for merchants and lost processing fees for the other network parties based on those abandoned transactions; (v) unavailability of customizable fraud-related services to merchants and/or merchant acquirers; (vi) increased risk with merchant liability for fraudulent transactions; and (vii) issuers having limited access to some data that may be used to fraud-score transactions.

In one embodiment, a computer program is provided, and the program is embodied on a computer readable medium and utilizes Structured Query Language (SQL) to create, retrieve, update, and/or delete data within a database. For example, SQL may be used with a client user interface front-end for administration and a web interface for standard user input and reports. In an example embodiment, the system is web enabled and is run on a business-entity intranet. In yet another embodiment, the system is fully accessed by individuals having an authorized access outside the firewall of the business-entity through the Internet. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T, New York, N.Y.). The application is flexible and designed to run in various different environments without compromising any major functionality.

The systems and processes are not limited to the specific embodiments described herein. In addition, components of each system and each process can be practiced independent of and separate from other components and processes described herein. Each component and process also can be used in combination with other assembly packages and processes.

FIG. 1 illustrates a multi-party transaction card industry system 20 for enabling ordinary payment-by-card transactions in which a merchant 24 and an issuer 30 do not need to have a one-to-one special relationship. A financial institution 30 called the "issuer" provides a card, such as a credit card, to a cardholder 22, who uses the card to tender payment for a purchase from a merchant 24. To accept payment with the card, merchant 24 must normally establish an account with a financial institution 26 called the "merchant bank," "acquiring bank," or "acquirer bank." When cardholder 22 tenders payment for a purchase with a card, merchant 24 requests authorization from merchant bank 26 for the amount of the purchase. The request may be performed over the telephone, but is usually performed through the use of a point-of-sale terminal, which reads the cardholder's account information from the magnetic stripe or chip on the card and communicates electronically with the transaction processing computers of merchant bank 26. Alternatively, merchant bank 26 may authorize a third party called a "merchant processor," an "acquiring processor," or a "third party processor" to perform transaction processing on its behalf. In this case, the point-of-sale terminal will be configured to communicate with the third party. A point-of-sale terminal may include without, limitation, a computer system operated by a merchant and/or by a cardholder.

Using an payment processing network computer system that is associated with a payment processing network 28, the computers of merchant bank 26 communicate with the computers of issuer bank 30 to determine whether a cardholder's account 32 is in good standing and whether the purchase is covered by the consumer's available credit line. Based on these determinations, the request for authorization will be declined or accepted. If the request is accepted, an authorization code is issued to merchant 24 and an available credit line of cardholder's account 32 is decreased.

Normally, a charge for a credit transaction is not posted immediately to cardholder's account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated.

After a transaction is captured, the transaction is settled between merchant 24, merchant bank 26, payment processing network 28, and issuer 30. Settlement refers to the transfer of financial data or funds between merchant 24, merchant bank 26, payment processing network 28, and issuer 30 related to the transaction. Usually, transactions are captured and accumulated into a "batch," which are settled as a group. More specifically, a transaction is typically settled between issuer 30 and payment processing network 28, and then between payment processing network 28 and merchant bank 26, and then between merchant bank 26 and merchant 24.

During transaction processing, authentication data is generated by various entities, including issuer 30 and merchant bank 26. AM computer device 112 (described in greater detail below with respect to FIGS. 2 and 3) collects the generated authentication data via authentication data files. AM computer device 112 is configured to, for example, check whether an issuer is using a preferred or supported authentication type. Based on the received authentication data, AM computer device 112 tests the performance of, for example, an issuer computer device or an ACS computer device associated with the issuer. In the event that authentication data generated by issuer 30 fails one or more defined benchmarks, AM computer device 112 is configured to initiate a remediation process for issuer 30. In one embodiment, AM computer device 112 reduces access for issuer 30 to a digital authentication program offered by AM computer device 112, until issuer 30 improves its performance as reflected in the authentication data that AM computer device 112 continues to receive from issuer 30.

Financial transaction cards or payment cards can refer to credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile telephones, personal digital assistants (PDAs), and key fobs.

Figure 2:
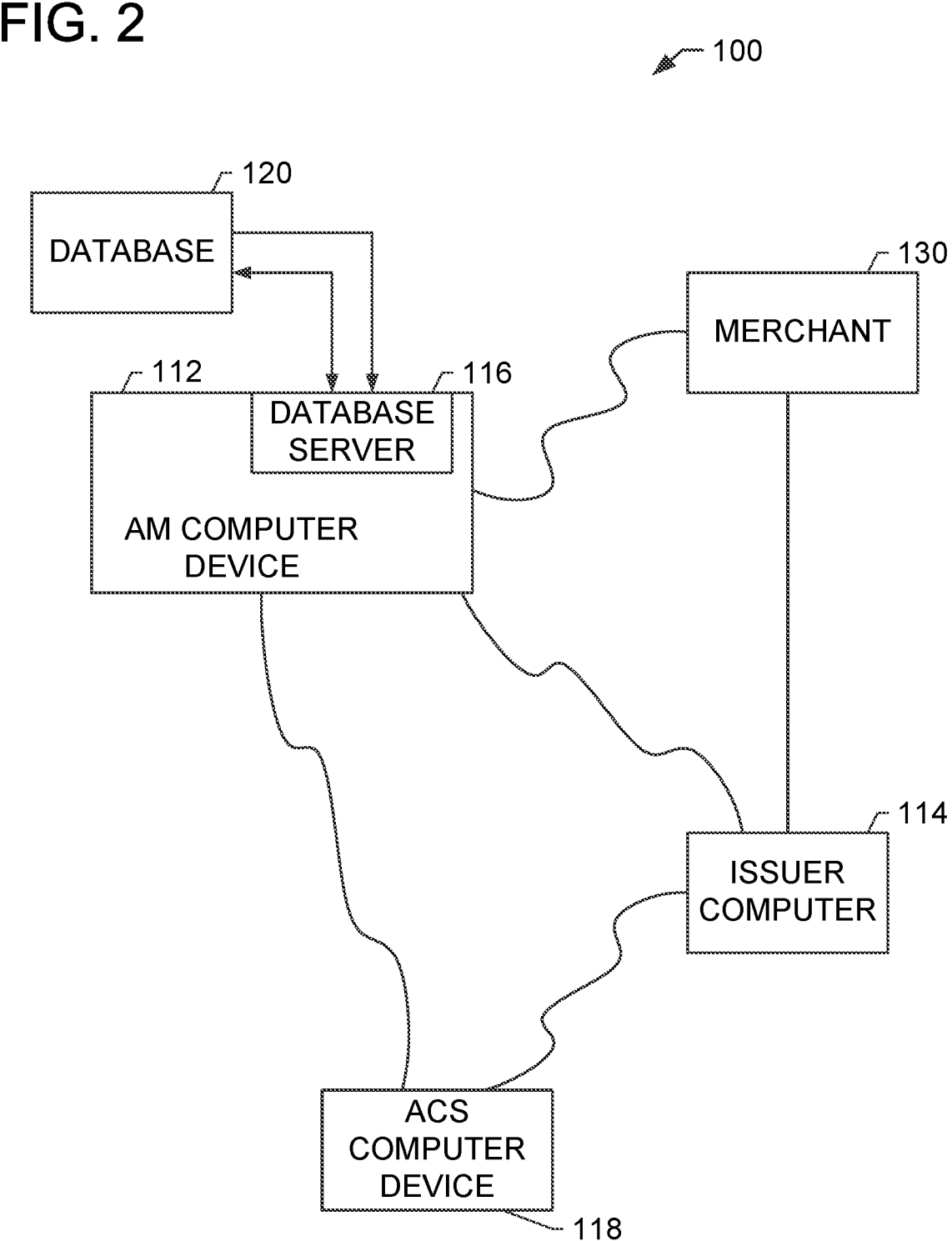
FIG. 2 is a block diagram of a server architecture of an authentication monitoring (AM) computer device that facilitates monitoring of digital authentication programs in accordance with the present invention.

FIG. 2 is a block diagram of an example system 100 including an AM computer device in accordance with one embodiment of the present invention. In the example embodiment, system 100 facilitates monitoring of authentication methods. More specifically, in the example embodiment, system 100 includes a server system 112 (i.e., AM computer device) communicatively coupled to an issuer computer 114 (associated with an issuer bank). Server system 112 may also be referred to as a payment processor computer system.

In one embodiment, server system 112 is configured to receive an authentication data file from issuer computer 114. Server system 112 processes the authentication data file to extract at least one authentication value from the authentication data file. Server system 112 updates a stored metric corresponding to the authentication value, and determines that the stored metric fails to meet a predefined benchmark. Server system 112 generates an action recommendation for an issuer associated with issuer computer 114 and transmits the action recommendation to the issuer computer 114.

In the example embodiment, issuer computer 114 is connected to an ACS computer device 118 that is associated with an access control service that provides authentication services to the issuer. For example, ACS computer device 118 may provide fingerprint matching services to issuer computer 114. The ACS computer device 118 is also connected to server system 112, to which it transmits authentication data files. Authentication data files may also be transmitted directly by issuer computer 114, which is a computer that include a web browser, which enable issuer computer 114 to access server system 112 using the Internet. More specifically, issuer computer 114 are communicatively coupled to the Internet through many interfaces including, but not limited to, at least one of a network, such as the Internet, a local area network (LAN), a wide area network (WAN), and/or an integrated services digital network (ISDN), a dial-up-connection, a digital subscriber line (DSL), and a cable modem. Issuer computer 114 can be any device capable of accessing the Internet including, but not limited to, a desktop computer, a laptop computer, a personal digital assistant (PDA), or other web-based connectable equipment.

System 100 also includes merchant computer 130, which is connected to issuer computer 114 and may be connected to server system 112. Merchant computer 130 is interconnected to the Internet through many interfaces including a network, such as a local area network (LAN) or a wide area network (WAN), dial-in-connections, cable modems, wireless modems, and special high-speed ISDN lines. Merchant computer 130 could be any device capable of interconnecting to the Internet and including an input device capable of reading information from a consumer's financial transaction card (e.g., a point of sale device). Alternatively, or in addition, merchant computer 130 may include merchant computer systems that interact with a remote user, such as through a merchant website.

A database server 116 is communicatively coupled to a database 120 that contains a variety of information including, but not limited to, cardholder data, authentication method data, benchmark data, authentication data files, issuer enrollment data, ACS data, merchant data, merchant MPI data, or the like. Moreover, the database 120 can include multiple account numbers for an account holder. In addition, each particular account number can have its own corresponding set of information specific for the particular account number. In the example embodiment, database 120 is stored remotely from server system 112. In an alternate embodiment, database 120 is decentralized. In the example embodiment, a person can access database 120 via issuer computer 114 by logging onto server system 112.

The database 120 also includes information relating to the authentication protocol described above. According to some embodiments, the authentication protocols may be referred to as Three Domain Protocol (3-D Secure®) (3-D Secure is a registered trademark of Visa International Service Association located in Foster City, Calif.) or MasterCard SecureCode® (MasterCard SecureCode is a registered trademark of MasterCard International Incorporated located in Purchase, N.Y.). The authentication protocol in these embodiments is utilized by other financial card companies as well. The authentication protocol defines a standard for utilizing authentication credentials (e.g., a user name and/or password) to verify the identity of a user of a financial card. The standard for utilizing authentication credentials includes, for example, procedures for establishing the credentials, procedures for requesting and verifying the veracity of the credentials, and standards for communicating the results of the verification of the credentials to the directory server (e.g., payment processing network) and/or the issuing bank. Protocols in general are commonly recognized as a set of rules governing the format of messages that are exchanged between computers. For example, a protocol may be a specific set of rules, procedures, or conventions relating to format and timing of data transmission between two devices.

In the example embodiment, server system 112 may be associated with a payment processing network, and may be referred to as an payment processing network computer system. Additionally, a check-out platform may be associated with the payment processing network. Server system 112 may be used for processing transaction data and for registering cardholders into a plurality of programs offered by the payment processing network. In addition, at least one of issuer computer 114 may include a computer system associated with an issuer of a transaction card. Accordingly, server system 112 and issuer computer 114 may be utilized to process transaction data relating to purchases made by a cardholder utilizing a transaction card that is processed by the payment processing network and issued by the associated issuer. Another client system 114 may be associated with a user or a cardholder seeking to register, access information or process a transaction with at least one of the payment processing network, the issuer, the POS, or the MPI device.

The embodiments illustrated and described herein as well as embodiments not specifically described herein but within the scope of aspects of the invention constitute example means for performing a financial transaction, and more particularly, constitute example means for authenticating a payer in a financial transaction using a one-time password. For example, the server system 112, POS terminal 115, or the client system 114, or any other similar computer device, programmed with computer-executable instructions to execute processes and techniques with a processor as described herein, constitutes example means for monitoring use of authentication methods.

Figure 3:
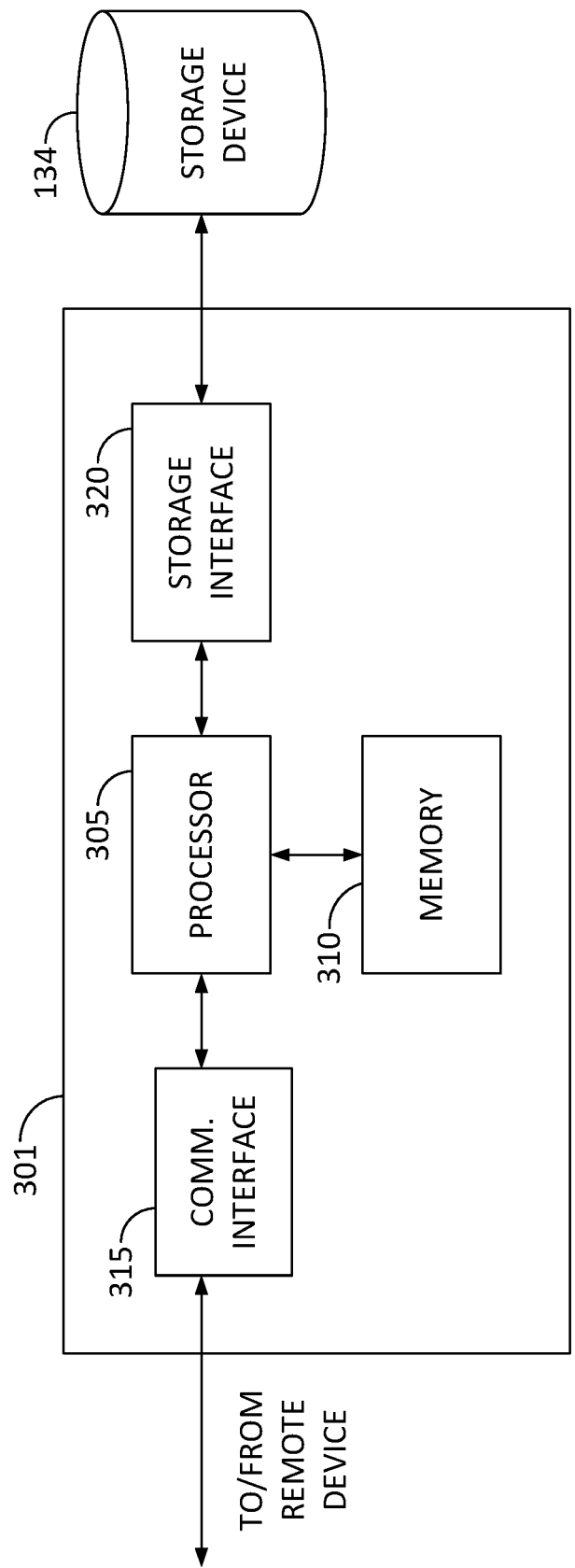
FIG. 3 shows an example configuration of a server system, such as an AM computer device (shown in FIG. 2) configured to monitor implementation of one or more digital authentication programs.

FIG. 3 shows an example configuration of a server system, such as an AM computer device (shown in FIG. 2) configured to monitor implementation of one or more digital authentication programs. Server system 301 may include, but is not limited to, database server 116 or AM computer device 112 (shown in FIG. 2). In some embodiments, server system 301 is similar to server system 112 (shown in FIG. 2).

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. More specifically, the instructions may cause various data manipulations on data stored in storage 134 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 305 is operatively coupled to a communication interface 315 such that server system 301 is capable of communicating with a remote device such as a user system or another server system 301. For example, communication interface 315 may receive communications from issuer computing devices 114 via the Internet, as illustrated in FIG. 2.

Processor 305 may also be operatively coupled to a storage device 134. Storage device 134 is any computer-operated hardware suitable for storing and/or retrieving data. In some embodiments, storage device 134 is integrated in server system 301. In other embodiments, storage device 134 is external to server system 301 and is similar to database 120 (shown in FIG. 2). For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
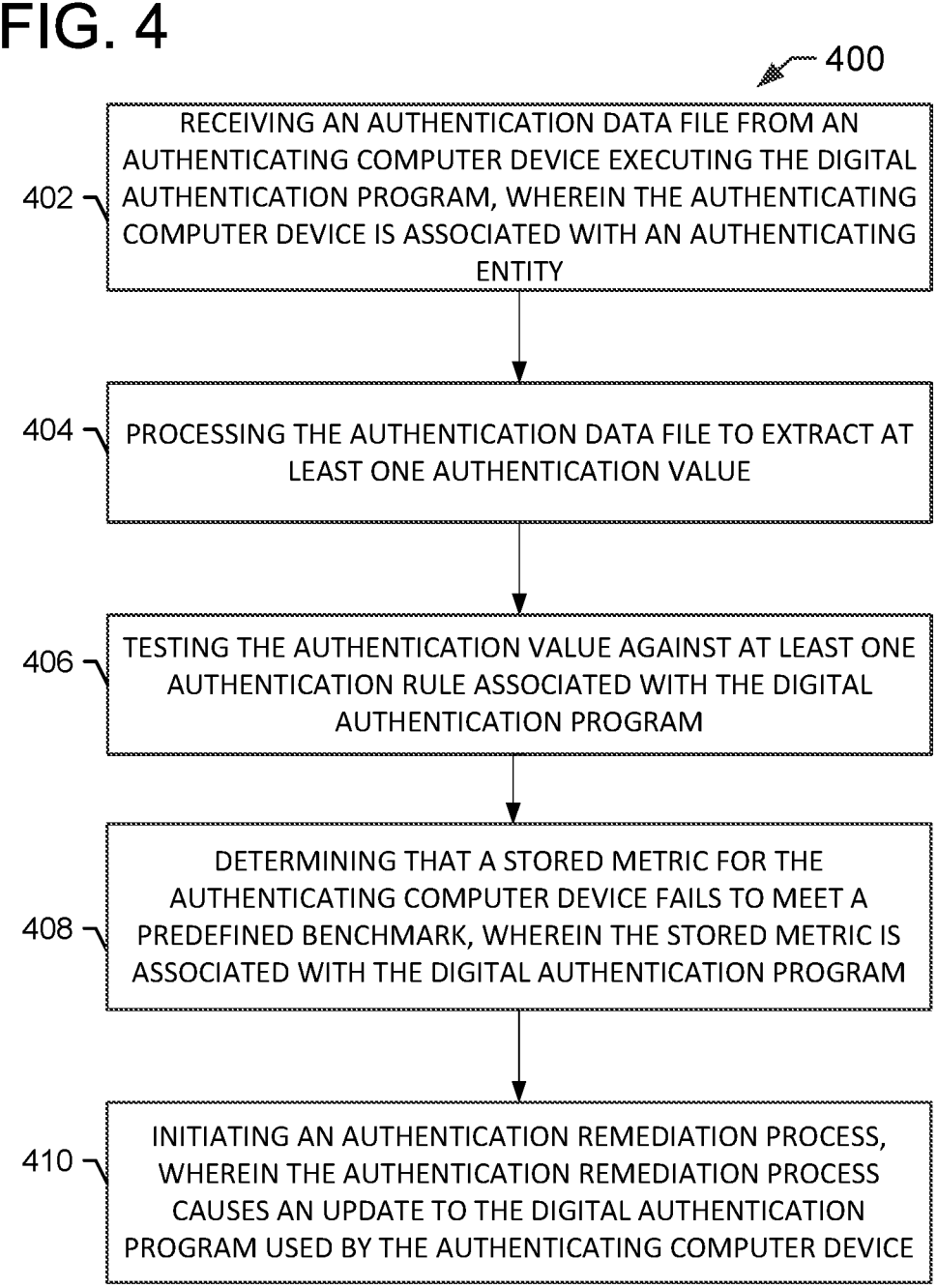
FIG. 4 is a method flow illustrating method steps that the AM computer device performs in order to monitor execution of a digital authentication program.

FIG. 4 is a method flow 400 illustrating method steps that the AM computer device performs in order to monitor execution of a digital authentication program. In the exemplary embodiment, the digital authentication program may be executed by an authenticating computer device (e.g., an issuer computer device affiliated with an issuer of financial accounts). As shown, the AM computer device receives 402 an authentication data file from an authenticating computer device executing the digital authentication program. As described earlier, the authentication data file contains authentication data relevant to a transaction, in the form of one or more key-value pairs. The key-value pairs represent values for authentication variables (e.g., authentication type, issuer, authentication date/time, or the like). The AM computer device processes 404 the authentication data file to extract at least one authentication value from the authentication data file. For example, the AM computer device may extract the authentication type value from the authentication data file, and determine that the authentication type is "RBA with step up challenge."

Based on the authentication type value, the AM computer device tests 406 the authentication value against at least one authentication rule associated with the digital authentication program. For example, the AM computer device determines that the authentication type is RBA with step up challenge and also reviews an authentication rule which states that a certain proportion of the data processing performed by the authenticating computer device must use this authentication type (e.g., 95% out of the past transactions in a predetermined timeframe). In one embodiment, the AM computer device determines 408 at this point that a stored metric for the authenticating computer device fails to meet the RBA with step-up challenge benchmark for this issuer, which is 98%.

Based on the determination in step 408, the AM computer device initiates 410 an authentication remediation process. In one embodiment, the authentication remediation process causes an update to the digital authentication program used by the authenticating computer device. For example, the AM computer device may reduce or terminate an access for the authenticating computing device to the digital authentication program offered by the AM computer device. In another embodiment, the AM computer device may notify the issuer that it is failing the benchmark set for RBA with step-up challenge and generate an action recommendation that the issuer needs to remediate its authentication process to remain in compliance with authentication procedures. The action recommendation may include specific steps that the issuer must take in order to remediate.

Figure 5:
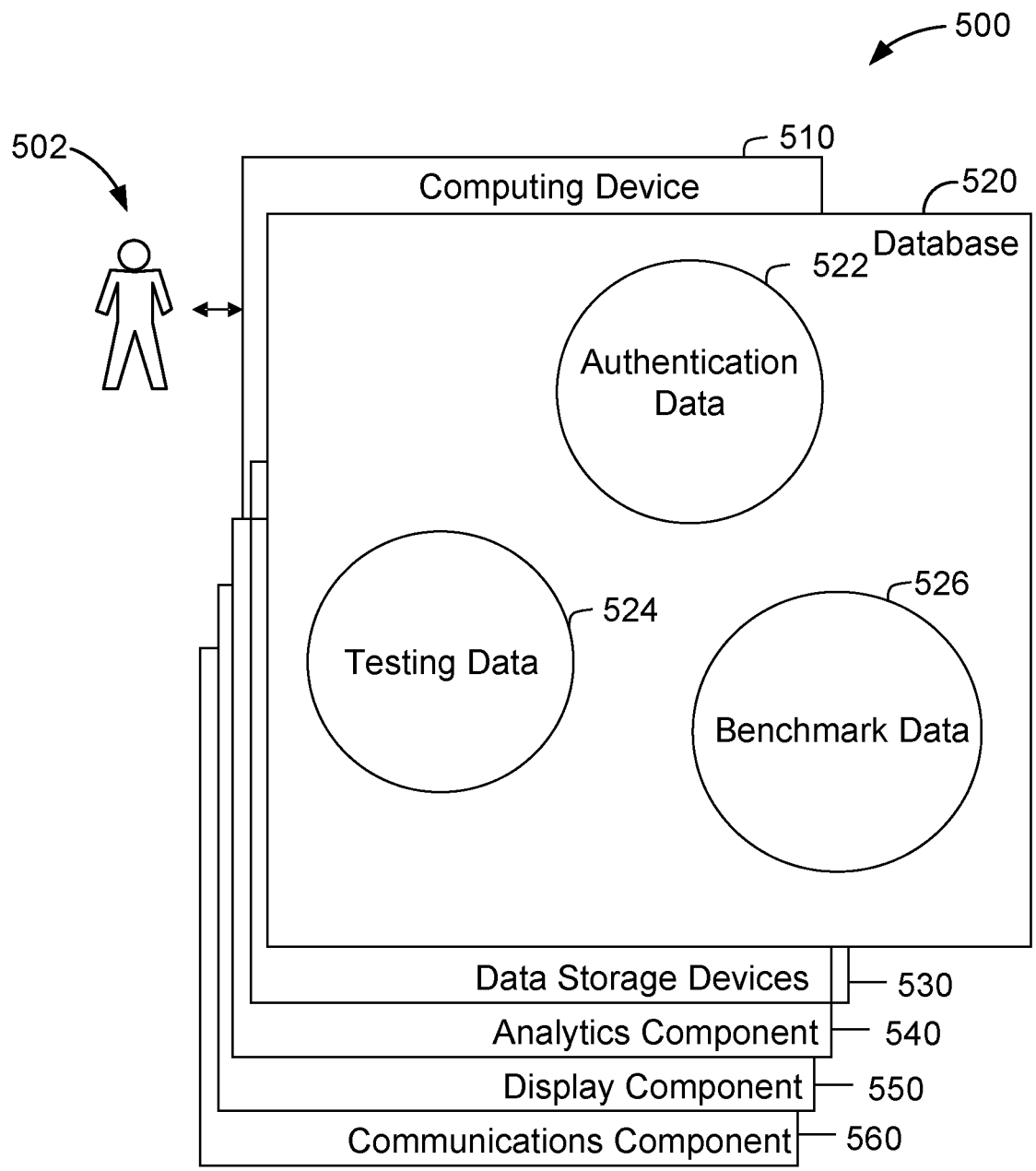
FIG. 5 shows an example configuration of a database associated with the AM computing device that, along with other related computing components, may be used to monitor execution of digital authentication programs.

FIG. 5 shows an example configuration of a database 500 associated with the AM computing device that, along with other related computing components, may be used to monitor execution of digital authentication programs. In some embodiments, computing device 510 is similar to server system 112 (shown in FIG. 2). User 502 (such as a user operating server system 112) may access computing device 510 in order to monitor the execution of one or more digital authentication programs. In some embodiments, database 520 is similar to database 134 (shown in FIG. 3). In the example embodiment, database 520 includes authentication data 522, testing data 524, and benchmark data 526. Authentication data 522 includes data extracted from authentication data files received from authenticating computer devices. Authentication data 522 includes accountholder authentication values (AAVs) which may be in the form of key-value pairs as described above. Authentication data 522 includes authentication type data, device data for authenticating computer devices and other connected devices (e.g., those used by, for example, cardholders, issuers, and merchants).

Testing data 524 includes, for example, statistical data (e.g., regarding transaction terminations due to authentication failure). Testing data 524 includes log data received from periodic tests of authenticating computer devices (e.g., performance data for an authenticating computer device that must present response times to a cardholder computer device of ten seconds or less). Testing data includes data collected from customer-facing applications affiliated with the authenticating computer device (e.g., a mobile device application screen that must be configured to show only the last four digits of a cardholder PAN) or the like. Benchmark data 526 includes benchmark levels or predefined metrics defined for each authentication computer device. In other words, benchmark data 526 defines target levels that each authentication computer device must meet in order to continue participating in the digital authentication program offered via the AM computer device. Benchmark data 526 includes, for example, transaction percentage data (e.g., no. of successful transactions required to be processed), response time data, authentication rule data (e.g., 100% of one-time-use password with SMS transactions must ensure that only last 4 digits of PAN are displayed onscreen) or the like.

Computing device 510 also includes data storage devices 530. Computing device 510 also includes analytics component 540 that processes authentication data files received from authenticating computing devices. Computing device 510 also includes display component 550 that receives processed authentication data from analytics component 540 and converts it into various formats in order to provide data in a format compatible with various different user computing devices. Computing device 510 also includes communications component 560 which is used to communicate with authenticating computing devices, issuer computing devices, and merchant computing devices, using predefined network protocols such as TCP/IP (Transmission Control Protocol/Internet Protocol) over the Internet.

A computer device, such as those described herein, includes at least one processor or processing unit and a system memory. The computer device typically has at least some form of computer readable media. By way of example and not limitation, computer readable media include computer storage media and communication media. Computer storage media include volatile and nonvolatile, removable and non-removable physical media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

The methods described herein may be encoded as executable instructions embodied in a computer readable medium, including, without limitation, a computer storage medium, a storage device, and/or a memory device. Such instructions, when executed by a processor, cause the processor to perform at least a portion of the methods described herein.

Although the present invention is described in connection with an example financial transaction processing system environment, embodiments of the invention are operational with numerous other general purpose or special purpose financial transaction processing system environments or configurations. The financial transaction processing system environment is not intended to suggest any limitation as to the scope of use or functionality of any aspect of the invention. Moreover, the financial transaction processing system environment should not be interpreted as having any dependency or requirement relating to any one or combination of components illustrated in the example operating environment. Examples of well known financial transaction processing systems, environments, and/or configurations that may be suitable for use with the embodiments described herein include, but are not limited to, embedded computer devices, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments may be described in the general context of computer-executable instructions, such as program components or modules, executed by one or more computers, processors, and/or other devices. Aspects of the invention may be implemented with any number and organization of components or modules. For example, embodiments are not limited to the specific computer-executable instructions or the specific components or modules illustrated in the figures and described herein. Alternative embodiments may include different computer-executable instructions or components having more or less functionality than illustrated and described herein.

The order of execution or performance of the operations in the embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the described embodiments.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated processes. The patentable scope of the invention is defined by the claims, and may include other examples that occur to those skilled in the art. These other examples are intended to be within the scope of the claims if they have structural elements that do not differ from the literal language of the claims, or if they include equivalent structural elements with insubstantial differences from the literal languages of the claims.

What is claimed is:

1. A method for monitoring execution of a digital authentication program, the method implemented using an authentication monitoring (AM) computer device comprising a processor and a memory device, the method comprising:
   receiving at least one authentication data file from an authenticating computer device executing the digital authentication program, wherein the authenticating computer device is associated with an authenticating entity, wherein the authenticating computer device includes computer-executable instructions stored thereon and programmed to execute processes of the digital authentication program, wherein the authentication data file is generated during an electronic transaction performed by a cardholder using a cardholder computer device in association with a merchant computer device, and wherein the at least one authentication data file includes authentication data from a plurality of authentication procedures performed by the digital authentication program for a plurality of users;
   extracting at least one authentication value from the authentication data for each of the plurality of authentication procedures, wherein the at least one authentication value indicates one of a plurality of types of the corresponding authentication procedure used by the authenticating computer device;
   updating, for each of the types, a stored metric using the authentication data associated with the corresponding at least one authentication value, wherein the stored metric aggregates outcomes associated with the corresponding type of authentication procedure across a plurality of previous electronic transactions;
   determining that the stored metric for at least one of the types fails to meet a corresponding predefined benchmark for overall performance across the plurality of previous electronic transactions;
   in response to the determining, reducing a benefit accorded to the authenticating entity, wherein the benefit includes at least one of: access to the digital authentication program and a monetary value exchanged for use of the digital authentication program;
   generating one or more action recommendations for the authenticating entity, the one or more action recommendations including instructions to adjust the plurality of authentication procedures to meet the corresponding predefined benchmark; and
   transmitting the one or more action recommendations to the authenticating computer device.

2. The method in accordance with claim 1, wherein the authenticating entity includes at least one of an issuer and a merchant.

3. The method in accordance with claim 2, wherein the authentication value is generated by an access control server (ACS) computer device associated with the authenticating entity, and wherein the authentication value includes one or more of, a one-time-use password, a cryptographic representation of a fingerprint, a cryptographic representation of a facial feature, a cryptographic representation of a vocal recording, a predefined sequence of one or more numeric characters, and a predefined sequence of one or more alphabetical characters.

4. The method in accordance with claim 1, further comprising:
   receiving a test data file from the authenticating computer device;
   processing the test data file to extract at least one test authentication value for each of the types of authentication procedures;
   updating the stored metric for the authenticating computer device;
   determining that the stored metric fails to meet the predefined benchmark; and
   in response to the determining, reducing a benefit accorded to the authenticating entity.

5. The method in accordance with claim 1, wherein the at least one authentication value includes a risk-based authentication (RBA) procedure type, wherein the authentication data includes a recommendation of a level of authentication, and wherein the authentication data indicates a level of compliance with of the recommendation.

6. The method in accordance with claim 1, the method further comprising:
   extracting an enrollment type from the authentication data file;
   updating an enrollment metric corresponding to the enrollment type;
   determining that the enrollment metric fails to meet a predefined enrollment benchmark; and
   updating the stored metric based on the determined failure to meet the predefined enrollment benchmark.

7. The method in accordance with claim 1, wherein the plurality of types of authentication procedures includes disallowed types, and wherein the corresponding predefined benchmark for each disallowed type is zero usage.

8. A system for monitoring execution of a digital authentication program, the system including an authentication monitoring (AM) computer device comprising a processor and a memory device, the AM computer device configured to:
   receive at least one authentication data file from an authenticating computer device executing the digital authentication program, wherein the authenticating computer device is associated with an authenticating entity, wherein the authenticating computer device includes computer-executable instructions stored thereon and programmed to execute processes of the digital authentication program, wherein the authentication data file is generated during an electronic transaction performed by a cardholder using a cardholder computer device in association with a merchant computer device, and wherein the at least one authentication data file includes authentication data from a plurality of authentication procedures performed by the digital authentication program for a plurality of users;
   extract at least one authentication value from the authentication data for each of the plurality of authentication procedures, wherein the at least one authentication value indicates one of a plurality of types of the corresponding authentication procedure used by the authenticating computer device;

update, for each of the types, a stored metric using the authentication data associated with the corresponding at least one authentication value, wherein the stored metric aggregates outcomes associated with the corresponding type of authentication procedure across a plurality of previous electronic transactions;

determine that the stored metric for at least one of the types fails to meet a corresponding predefined benchmark for overall performance across the plurality of previous electronic transactions;

in response to the determining, reducing a benefit accorded to the authenticating entity, wherein the benefit includes at least one of: access to the digital authentication program and a monetary value exchanged for use of the digital authentication program;

generate one or more action recommendations for the authenticating entity, the one or more action recommendations including instructions to adjust the plurality of authentication procedures to meet the corresponding predefined benchmark; and transmit the one or more action recommendations to the authenticating computer device.

9. The system in accordance with claim 8, wherein the authenticating entity includes at least one of an issuer and a merchant.

10. The system in accordance with claim 9, wherein the authentication value is generated by an access control server (ACS) computer device associated with the authenticating entity, and wherein the authentication value includes one or more of, a one-time-use password, a cryptographic representation of a fingerprint, a cryptographic representation of a facial feature, a cryptographic representation of a vocal recording, a predefined sequence of one or more numeric characters, and a predefined sequence of one or more alphabetical characters.

11. The system in accordance with claim 8, wherein the AM computer device is configured to:

receive a test data file from the authenticating computer device;

process the test data file to extract at least one test authentication value for each of the types of authentication procedures;

update the stored metric for the authenticating computer device;

determine that the stored metric fails to meet the associated predefined benchmark; and in response to the determining, reduce a benefit accorded to the authenticating entity.

12. The system in accordance with claim 11, wherein the test data file is generated by the authenticating computer device.

13. The system in accordance with claim 8, wherein the at least one authentication value includes a risk-based authentication (RBA) procedure type, wherein the authentication data includes a recommendation of a level of authentication, and wherein the authentication data indicates a level of compliance with of the recommendation.

14. The system in accordance with claim 8, wherein the AM computer device is configured to:

extract an enrollment type from the authentication data file;

update an enrollment metric corresponding to the enrollment type;

determine that the enrollment metric fails to meet a predefined enrollment benchmark; and updating the stored metric based on the determined failure to meet the predefined enrollment benchmark.

15. A non-transitory computer readable medium that includes computer executable instructions for monitoring an execution of a digital authentication program, wherein when executed by an authentication monitoring (AM) computer device comprising a processor and a memory device, the computer executable instructions cause the AM computer device to:

receive at least one authentication data file from an authenticating computer device executing the digital authentication program, wherein the authenticating computer device is associated with an authenticating entity, wherein the authenticating computer device includes computer-executable instructions stored thereon and programmed to execute processes of the digital authentication program, wherein the authentication data file is generated during an electronic transaction performed by a cardholder using a cardholder computer device in association with a merchant computer device, and wherein the at least one authentication data file includes authentication data from a plurality of authentication procedures performed by the digital authentication program for a plurality of users;

extract at least one authentication value from the authentication data for each of the plurality of authentication procedures, wherein the at least one authentication value indicates one of a plurality of types of the corresponding authentication procedure used by the authenticating computer device;

update, for each of the types, a stored metric using the authentication data associated with the corresponding at least one authentication value, wherein the stored metric aggregates outcomes associated with the corresponding type of authentication procedure across a plurality of previous electronic transactions;

determine that the stored metric for at least one of the types fails to meet a corresponding predefined benchmark for overall performance across the plurality of previous electronic transactions;

in response to the determining, reducing a benefit accorded to the authenticating entity, wherein the benefit includes at least one of: access to the digital authentication program and a monetary value exchanged for use of the digital authentication program;

generate one or more action recommendations for the authenticating entity, the one or more action recommendations including instructions to adjust the plurality of authentication procedures to meet the corresponding predefined benchmark; and transmit the one or more action recommendations to the authenticating computer device.

16. The non-transitory computer readable medium in accordance with claim 15, wherein the authentication value is generated by an access control server (ACS) computer device associated with the authenticating entity, and wherein the authentication value includes one or more of, a one-time-use password, a cryptographic representation of a fingerprint, a cryptographic representation of a facial feature, a cryptographic representation of a vocal recording, a predefined sequence of one or more numeric characters, and a predefined sequence of one or more alphabetical characters.

17. The non-transitory computer readable medium in accordance with claim 15, wherein the computer-executable instructions further cause the AM computer device to:
receive a test data file from the authenticating computer device;
process the test data file to extract at least one test authentication value for each of the types of authentication procedures;
update the stored metric for the authenticating computer device;
determine that stored metric fails to meet the predefined benchmark; and
in response to the determining, reduce a benefit accorded to the authenticating entity.

18. The non-transitory computer readable medium in accordance with claim 17, wherein the test data file is generated by the authenticating computer device.

19. The non-transitory computer readable medium in accordance with claim 15, wherein the at least one authentication value includes a risk-based authentication (RBA) procedure type, wherein the authentication data includes a recommendation of a level of authentication, and wherein the authentication data indicates a level of compliance with of the recommendation.

20. The non-transitory computer readable medium in accordance with claim 15, wherein the computer-executable instructions further cause the AM computer device to:
extract an enrollment type from the authentication data file;
update an enrollment metric corresponding to the enrollment type;
determine that the enrollment metric fails to meet a predefined enrollment benchmark; and
update the stored metric based on the determined failure to meet the predefined enrollment benchmark.

* * * * *